Patented Mar. 12, 1940

2,192,927

UNITED STATES PATENT OFFICE 2,192,927

INSECTICIDE

Henry L. Morrill, Clayton, Mo., assignor to Monsanto Chemical Company, St. Louis, Mo., a corporation of Delaware No Drawing. Application October 1, 1937, Serial No. 166,733

5 Claims. (Cl. 167—30)

This invention relates to insecticides and more particularly to a new series of compounds of exceptional activity for the control of insect pests.

The principal object of the present invention is to provide a contact poison for insects which poison is characterized by an exceptionally specific action for refractory insects such as the red spider, *Tetranychus telarius* (Linne) and the onion thrips, *Thrips tabaci*, and which is without substantial deleterious effect on growing plants. Another object of the invention is to provide a method of producing these insecticidal substances. These and other objects will be apparent from the description which follows hereinafter.

I have discovered that N-alkyl-N-benzyl-cyclohexylamines are particularly powerful contact poisons for insects in general. Compounds of this series, such as N-ethyl-N-benzyl-cyclohexylamine, N-amyl-N-benzyl-cyclohexylamine and N-2-ethylhexyl-N-benzyl-cyclohexylamine, possess a powerful insecticidal activity against insects which are particularly difficult to exterminate, for example, the red spider, leaf hopper and thrips, particularly those of the species mentioned. This insecticidal action is attained without any substantial harmful or deleterious action on the plants infested with these insects.

Heretofore it has been proposed to use a multitude of substances, including various cyclohexylamine derivatives for combating insects. The use of these prior substances has not proved sufficiently beneficial nor economical in the control of various insects. Of the many cyclohexylamine derivatives which have been suggested the compound most nearly analogous to those of the present invention is N-phenyl-N-benzyl-cyclohexylamine (cyclohexylbenzylaniline). Not only has this compound proved to be considerably less active against insects than any of the compounds contemplated in this invention, but it has a particularly deleterious action on plants to which it is applied, causing a burning of the foliage. Even were this compound more active insecticidally than the compounds of my invention, its destructive action on foliage would seriously militate against its extensive use.

The compounds contemplated for use as insecticides in my invention are N-alkyl-N-benzyl-cyclohexylamines, for example, N-ethyl-N-benzyl-cyclohexylamine, N-n-butyl-N-benzyl-cyclohexylamine, N-n-amyl-N-benzyl-cyclohexylamine, N-n-hexyl-N-benzyl-cyclohexylamine, N-octyl-N-benzyl-cyclohexylamine, etc., and their isomers as well as the corresponding C-alkyl-cyclohexylamine derivatives, such as result from alkylation and subsequent benzylation of the hydrogenated toluidines (hexahydrotoluidines, etc.). Instead of the benzylated compound I may use the corresponding xylylated derivatives, that is, C-alkylated benzyl derivatives. The compounds may be further substituted by a halogen such as chlorine, and the N-alkyl group of the N-alkyl-N-benzyl-cyclohexylamine may be substituted by a chlorine, hydroxyl or a similar group, for example, N-ethylol-N-benzyl-cyclohexylamine. The compounds are tertiary amines containing the N-benzyl-N-cyclohexyl-amine nucleus and correspond to the formula—

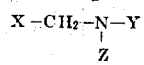

in which X is a phenyl, C-alkyl or C-halogen-substituted phenyl group; Y is a cyclohexyl or C-alkyl- or C-halogen-substituted cyclohexyl group; and Z is an alkyl, chloroalkyl, or alkylol group. The compounds and typical methods for their production are described hereinafter.

In using my invention the N-alkyl-N-benzyl-cyclohexylamine is dissolved or emulsified in the manner customarily used for the production of sprays. My preferred method of using these compounds consists in dissolving them in spreading or emulsifying oils such as that known under the trade name of Albasol, a sulfonated cod fish oil, in the proportion of approximately 70% insecticide and 30% oil and thereafter emulsifying this oil solution in water to a desired concentration. Usually a dilution of 1 part of the N-alkyl-N-benzyl-cyclohexylamine to 500 parts of water produces a spray solution of sufficient potency to produce a substantially 100% kill of red spider, which is one of the most refractory of plant insects. This concentration is advantageously varied however, to suit individual requirements and will be controlled to a great degree by the potency of the particular compound of this series, the degree of infestation, the resistance or refractory nature of the particular insect, and the method of application of the spray. Gums such as karaya gum and the like may be used in the compositions to increase adherence of the insecticide and thereby increase its effectiveness. The insecticidal compounds may also be applied in the form of dusts or powders of the usual formulations prepared by the customary methods for use with contact insecticides. For use in orchards, gardens, fields and greenhouses, the use of aqueous vehicles for distributing the insecticide is preferred for economy but for household use in sprays for the extermination of flies, naphtha and kerosene and similar solvents, preferably with the addition of perfuming substances, is contemplated. An aqueous emulsion of a 1–400 dilution is eminently satisfactory for removing fleas from dogs by using this emulsion in the manner of a sheep dip, the emulsion being without harmful effect on dogs.

Comparative tests have been made with the insecticidal substances of the invention. Examples of these follow:

*Example 1.*—Emulsions of the various insecticidal substances were prepared by dissolving the substance in an equal weight of pine oil and an equal weight of Albasol, which solution was then dispersed in water to the dilution indicated in the table. These sprays were applied to bean plants infested with red spider. The kills under comparable conditions were as indicated.

*Red spider on beans*

| Substance | Dilution | Kill |
| --- | --- | --- |
| | | Per cent |
| N-amyl-cyclohexylamine | 1–400 | 22 |
| N-phenyl-cyclohexylamine | 1–400 | 38 |
| N-benzyl-cyclohexylamine | 1–400 | 26 |
| N-phenyl-N-benzyl-cyclohexylamine | 1–400 | 32 |
| N-ethyl-N-benzyl-cyclohexylamine | 1–500 | 70 |
| N-amyl-N-benzyl-cyclohexylamine | 1–600 | 92 |
| N-amyl-N-benzyl-cyclohexylamine | 1–500 | 97 |
| N-2-ethylhexyl-N-benzyl-cyclohexylamine | 1–500 | 100 |

In the case of the phenyl compounds the foliage was in all cases burned or seared. The kills with the N-alkyl-N-benzyl-cyclohexylamines seem to be of an entirely different order from any of the other substituted cyclohexylamine derivatives. The N-amyl-N-benzyl-cyclohexylamine used in these tests was prepared from mixed amyl chlorides and consists of a mixture of isomeric compounds.

*Example 2.*—Emulsions of the insecticides were prepared in the manner described in Example 1. The emulsions were then sprayed on plants infested with the onion thrips, *Thrips tabaci*. The kills were as follows:

*Onion thrips*

| Substance | Dilution | Kill |
| --- | --- | --- |
| | | Per cent |
| N-phenyl-N-benzyl-cyclohexylamine | 1–400 | 22 |
| N-ethyl-N-benzyl-cyclohexylamine | 1–500 | 76 |
| N-amyl-N-benzyl-cyclohexylamine | 1–500 | 96 |
| N-2-ethylhexyl-N-benzyl-cyclohexylamine | 1–500 | 60 |

The method of preparing the N-alkyl-N-benzyl-cyclohexylamines consists briefly in benzylating the N-alkyl-cyclohexylamine by means of benzyl chloride and thereafter purifying the resulting N-alkyl-N-benzyl-cyclohexylamine. The N-alkyl-cyclohexylamines and methods for their preparation are known in the prior art, my preferred method consisting in alkylating cyclohexylamine under pressure by means of the alkyl halide and thereafter purifying the mixture. The method of preparing N-amyl-N-benzyl-cyclohexylamine is typical of a preferred method of preparation and is illustrated in the following example.

*Example 3.*—Into an autoclave provided with a stirrer place 3 mols of cyclohexylamine and 1 mol of mixed amyl chlorides. Heat this mixture with the stirrer in motion to a temperature of about 160° C. and maintain the batch at this temperature for a period of from about 4 to 6 hours, and maintaining the pressure at that reached during the heating. Cool the mixture to 100° C. and add an excess of sodium hydroxide (either in solid form or in solution) over that equivalent to the amyl chloride added (about 5% excess over 1 mol). Stir the mixture for about 1 to 2 hours, maintaining the temperature at 100° C., and thereafter separate off the oil and distill, preferably in vacuum. The N-amyl-cyclohexylamine boils in the range from 119° to 129° C. at 40 mm. pressure.

The benzylation of the N-amyl-cyclohexylamine is conducted by reacting the cyclohexylamine compound in the proportions of approximately 2 mols of N-amyl-cyclohexylamine and 1 mol of benzyl chloride by heating them together for about 1 hour or more at 150° C. with stirring. The benzylation proceeds smoothly. After reaction the mixture is cooled to about 100° C., and a 5% excess of sodium hydroxide over that corresponding to the benzyl chloride is added. This sodium hydroxide is added in the form of a solution, for example, in a 50% solution in water or other appropriate solvent, and not in solid form, to permit better contact of the mixture with the reagent. The resulting oil is then separated from the aqueous layer and thereafter distilled, preferably in vacuum.

The liquid isomeric N-amyl-N-benzyl-cyclohexylamine mixture resulting from this procedure has the following boiling ranges and other physical properties.

Boiling range: 154°–158° C. at 5 mm.; 166°–170° C. at 7 mm.; 169°–174° C. at 10 mm.; 291.8–329.5° C. at 760 mm.; 90% of the mixed isomers boil in the range 313.0°–326.9° C. at 760 mm.

Specific gravity at 25°/25° C.: 0.9261 to 0.9286.

Refractive index at 25° C.: 1.5060 to 1.5140.

Solubility: The N-amyl-N-benzyl-cyclohexylamine is insoluble in water but soluble in a wide variety of organic solvents; it is only sparingly to moderately soluble in organic hydroxy solvents such as alcohols, glycols, etc.

*Example 4.*—In a manner similar to that described in Example 3, by alkylating cyclohexylamine with ethyl chloride and benzylating the resulting N-ethyl-cyclohexylamine with benzyl chloride, N-ethyl-N-benzyl-cyclohexylamine is prepared.

N-ethyl-N-benzyl-cyclohexylamine has a boiling point of 119° C. at 2 mm. pressure and 113° C. at 1.25 mm. pressure. It is a colorless liquid at room temperature.

*Example 5.*—By starting with cyclohexylamine and alkylating with 2-ethylhexylchloride and thereafter benzylating the resulting N-octyl-cyclohexylamine with benzyl chloride, the corresponding N-2-ethylhexyl-N-benzyl-cyclohexylamine is prepared.

N-2-ethylhexyl-N-benzyl-cyclohexylamine is a colorless liquid at room temperature and has a boiling point of 155°–156° C. at a pressure of 1 mm.

Inasmuch as the above specification comprises preferred embodiments of the invention it is to be understood that the invention is not limited thereto but comprehends variations and modifications in manners known to the art, particularly in the preparation of the compounds of the invention and the method of their utilization as insecticides. It is to be understood that the invention is subject only to the limitations imposed by the appended claims.

What I claim is:

1. An insecticidal composition comprising a compound of the general formula:

$$X-CH_2-N-Y$$
$$\phantom{X-CH_2-N}|$$
$$\phantom{X-CH_2-N}Z$$

in which X is selected from the group consisting of phenyl, C-alkyl-substituted and C-halogen-substituted phenyl radicals; Y is selected from the group consisting of cyclohexyl, C-alkyl-substituted and C-halogen-substituted cyclohexyl radicals and Z is selected from the group consisting of alkyl, chloroalkyl and alkylol radicals, said compound being present in a concentration lethal to insects.

2. An insecticidal composition comprising an N-alkyl-N-benzyl-cyclohexylamine in a concentration lethal to insects.

3. An insecticidal composition comprising N-ethyl-N-benzyl-cyclohexylamine in a concentration lethal to insects.

4. An insecticidal composition comprising an N-amyl-N-benzyl-cyclohexylamine in a concentration lethal to insects.

5. An insecticidal composition comprising an N-octyl-N-benzyl-cyclohexylamine in a concentration lethal to insects.

HENRY L. MORRILL.